United States Patent
Allaart et al.

(10) Patent No.: US 8,708,631 B2
(45) Date of Patent: Apr. 29, 2014

(54) FASTENING ELEMENT FOR HARD CONSTRUCTIONAL COMPONENTS

(75) Inventors: Jan Allaart, Mauren (LI); Josef Glogger, Buchloe (DE); Franz-Xaver Huber, Guenzlhofen (DE); Juergen Wieser, Kaufering (DE)

(73) Assignee: Hilti Aktiengesellschat, Schaan (LI)

( * ) Notice: Subject to any disclaimer, the term of this patent is extended or adjusted under 35 U.S.C. 154(b) by 1225 days.

(21) Appl. No.: 11/514,023

(22) Filed: Aug. 30, 2006

(65) Prior Publication Data

US 2007/0053763 A1 Mar. 8, 2007

(30) Foreign Application Priority Data

Sep. 2, 2005 (DE) .......................... 10 2005 000 110

(51) Int. Cl.
*F16B 35/00* (2006.01)

(52) U.S. Cl.
USPC .......................... 411/387.4; 411/386; 411/395

(58) Field of Classification Search
USPC ................... 411/386, 387.4, 387.5, 395, 427, 411/29–31, 42–43, 55
See application file for complete search history.

(56) References Cited

U.S. PATENT DOCUMENTS

| | | | | |
|---|---|---|---|---|
| 126,366 A * | 4/1872 | Willis | ......................... | 411/387.4 |
| 255,816 A * | 4/1882 | Rogers | .......................... | 411/395 |
| 2,499,146 A * | 2/1950 | Kindt | ............................ | 411/403 |
| 2,707,897 A * | 5/1955 | Beeson | .......................... | 411/30 |
| 2,993,950 A * | 7/1961 | Forman | ..................... | 174/138 D |
| 3,007,364 A * | 11/1961 | Dickie | ............................. | 411/15 |
| 3,049,358 A * | 8/1962 | Polos | .............................. | 279/102 |
| 3,122,049 A * | 2/1964 | Dieterich et. al. | ........... | 411/54.1 |
| 3,124,029 A * | 3/1964 | Bell et al. | ......................... | 411/31 |
| 3,402,613 A * | 9/1968 | Neusel et. al. | ............... | 74/89.35 |
| 3,461,769 A * | 8/1969 | Brosseit | ........................ | 411/385 |
| 4,165,904 A * | 8/1979 | Reppert | .................... | 301/35.631 |
| 4,193,333 A * | 3/1980 | Hallock | ......................... | 411/176 |
| 4,402,637 A * | 9/1983 | Seghezzi et al. | ................. | 411/31 |
| 4,601,625 A * | 7/1986 | Ernst et al. | .................. | 411/387.4 |
| 4,652,194 A * | 3/1987 | Tajima et al. | .................. | 411/417 |
| 4,971,502 A * | 11/1990 | Oh | ................................. | 411/340 |
| 4,973,211 A * | 11/1990 | Potucek | ........................ | 411/452 |
| 5,183,357 A * | 2/1993 | Palm | ............................... | 411/29 |
| 5,234,299 A * | 8/1993 | Giannuzzi | ....................... | 411/31 |
| 5,308,203 A * | 5/1994 | McSherry et al. | ............... | 411/31 |
| 5,490,365 A * | 2/1996 | Roth | ............................... | 52/704 |
| 5,609,455 A * | 3/1997 | McKewan | ..................... | 411/386 |
| 6,135,688 A * | 10/2000 | Belz et al. | ........................ | 411/30 |
| 6,250,866 B1 * | 6/2001 | Devine | ........................ | 411/387.4 |
| 6,293,360 B1 * | 9/2001 | Liljebrand et al. | ............ | 175/320 |
| 6,619,899 B1 * | 9/2003 | Gaudron | ........................ | 411/386 |
| 6,910,841 B2 * | 6/2005 | Isenberg | ........................ | 411/386 |

* cited by examiner

*Primary Examiner* — Roberta Delisle
(74) *Attorney, Agent, or Firm* — Abelman, Frayne & Schwab

(57) ABSTRACT

A fastening element for hard constructional components such as concrete, masonry, and the like, includes a cylindrical base body (22; 42; 62) having an inwardly located engagement element (28; 48; 68) for the setting bit and formed as a through-opening (31; 51; 71) in the bottom section (23; 43; 63) which is provided at the first end of the base body, a receptacle (29) opening toward the second end (25), remote from the first end and adjoining the engagement element (28; 48; 68) in a direction toward the second end (25), and provided with load application means (30; 50); and a self-tapping thread (27) provided, at least regionwise, on an outer surface (26) of the base body (22, 42; 62).

1 Claim, 2 Drawing Sheets

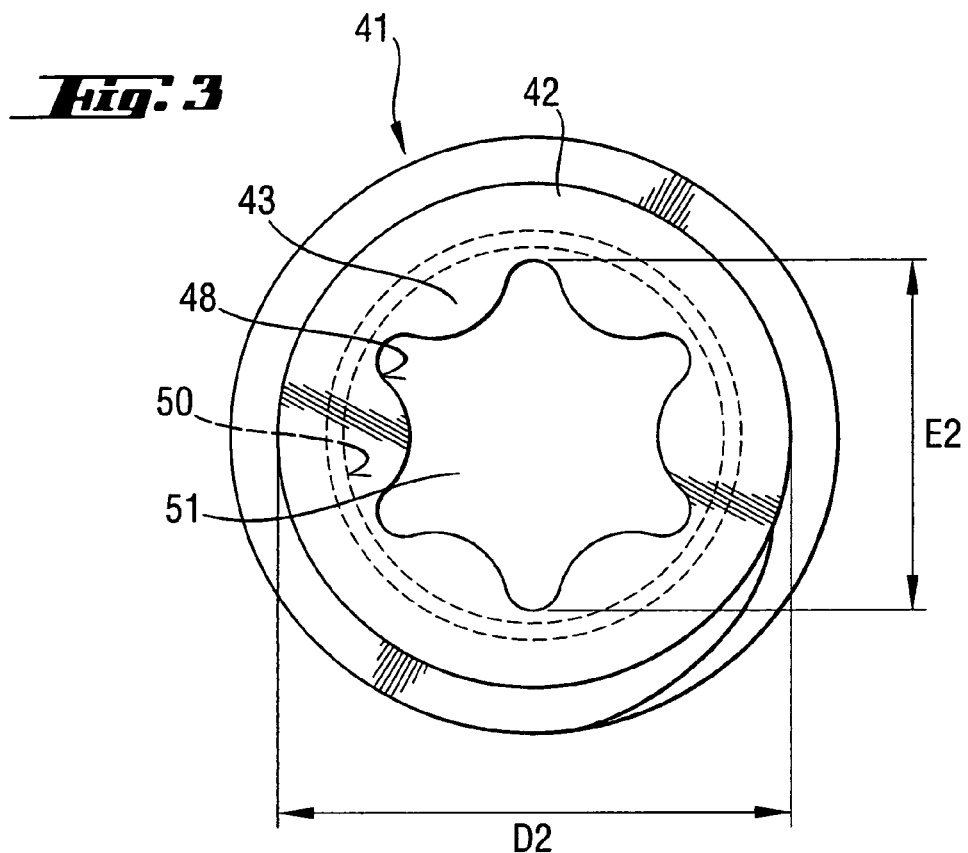
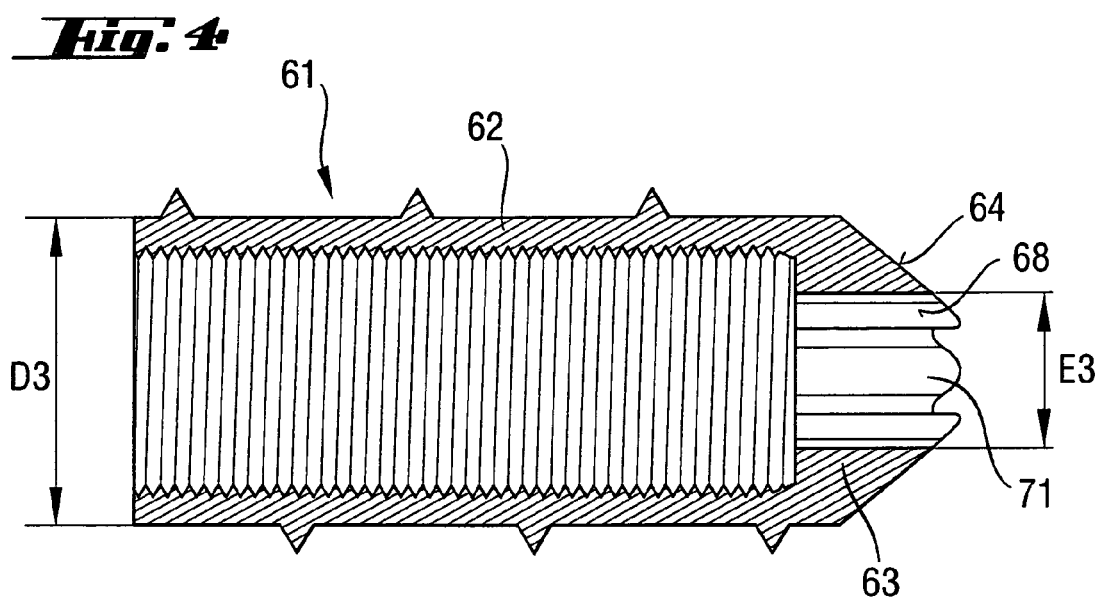

FASTENING ELEMENT FOR HARD CONSTRUCTIONAL COMPONENTS

BACKGROUND OF THE INVENTION

1. Field of the Invention

The present invention relates to a fastening element for hard constructional components such as concrete, masonry and the like and including a cylindrical base body having a first end with a bottom section, a second end remote from the first end, inwardly located engagement means for the setting bit and a receptacle opening toward the second end, adjoining the engagement means in a direction toward the second end, and provided with load application means, with the base body being provided with a self-tapping thread, at least regionwise, on its outer surface.

2. Description of the Prior Art

Fastening elements of the type described above are used for attachment of objects to the hard constructional components such as concrete, masonry, and the like. A fastening element is screwed in a preliminary formed borehole with a suitable setting bit, with the self-tapping thread forming a complementary thread in the constructional component or in the borehole wall. The fastening elements is anchored in the constructional component by the undercut formed by the complementary thread. The load application means, which is provided in the receptacle, is formed, e.g., as an inner thread into which an attachment element, such as e.g., a threaded rod or a screw is screwed in to form an attachment. Instead of the inner thread, a bayonet joint can be used.

European Publication EP 1 536 149 A2 discloses a fastening element of a type described above. The known fastening element has a cylindrical base body having a first, facing in the setting direction, end with a bottom section and a second and remote from the first end. On the outer surface of the base body, a self-tapping thread is provided. The base body has inwardly located, engagement means for the setting bit and a receptacle opening to the second end and adjoining, in the direction toward the second end, the engagement means. The receptacle is provided with an inner thread that forms load application means. In the end region of the first end, the engagement means is arranged at the same axial height of the base body as the thread runout of the self-tapping screw.

The drawback of the known fastening element consists in that formation of the engagement means at the bottom of the receptacle is connected with increased manufacturing costs, being costs-intensive. Further, with such fastening element, manufacturing possibilities are limited. Actually, at a mass production, for which such fastening elements are suited, an economical manufacturing is an important competitive advantage.

U.S. Pat. No. 5,630,688 discloses a self-tapping sleeve that is somewhat different from the subject fastening element. The self-tapping sleeve of U.S. Pat. No. 5,630,688 is designed for suspendable plaster ceilings for suspended lighting fixtures and includes a cylindrical base body having a first, facing in the setting direction of the sleeve, end and a second end remote from the first. On the outer surface of the base body, at the first end, there are provided two cutting elements which form, upon setting of the sleeve, an opening for the sleeve in the plaster ceiling. Between the first and second ends of the base body, there is provided engagement means for the setting tool and which simultaneously serves as a through-opening. The base body also has a receptacle opening toward the second end and adjoining the engagement means in the setting direction.

The drawback of the self-tapping sleeve of the above discussed U.S. patent consists in that it is unsuitable for use in hard components such as concrete, masonry and the like as no self-drilling fastening element can be used for such hard components. Nor can the above-described sleeve be used as a fastening element insertable in a preliminary formed borehole. It would have unnecessary cutters at the first end and would not have load application means.

Accordingly, an object of the present invention is to provide a fastening element for hard constructional components and that can be produced simply and, therefore, economically.

SUMMARY OF THE INVENTION

This and other objects of the present invention, which will become apparent hereinafter, are achieved by forming the engagement means as a through-opening in the bottom section of the fastening element.

The engagement means for the setting bit can be formed at any point in time during manufacturing of the fastening element. The engagement means can start either from the first end or from the second end of the base body.

Therefore, diverse, simple and economical manufacturing processes can be used for producing the inventive fastening element. In addition, the space in the borehole in front of the fastening element is accessible, after the fastening element has been set, through the engagement means, and this space can be filled with, e.g., mortar.

The receptacle or the load application means extends, advantageously, from the second end up to the engagement means, so that the entire section is available for transmitting loads over the fastening element. According to one embodiment, the load application means for the attachment means extends, in the receptacle, at a distance from the engagement means and/or the second end.

Advantageously, the maximal diameter of the through-opening corresponds to from 50% to 80% of the core diameter of the base body, which insures a stable shape of the engagement means for the setting bit for transmitting high torques for screwing in of the fastening element in a hard constructional component. Under the core diameter of the base body is understood the outer diameter of the base body without the self-cutting thread or the diameter of the thread root.

Advantageously, the base body has, between the load application means and the bottom section, a transition region for guiding the setting bit. The transition region is advantageously so formed that upon insertion of the setting bit, the bit is deflected for engagement with the engagement means. E.g., the transition region can be formed spherically or cup-shaped. Alternatively, the transition region can have funnel profile. The transition region provides a larger engagement surface for the setting bit upon engagement of the setting bit with the engagement means. The transition region enables to introduce larger torques then those transmitted in the absence of the transition region.

Advantageously, the first end of the base body has a conical profile, which facilitates insertion of the fastening element in an already available borehole and provides for centering of the fastening element in the borehole. In addition, the conical surface provides a larger engagement surface for the setting bit upon engagement with the engagement means, which provides for transmission of high torques.

According to a particular advantageous embodiment of the invention, the fastening element has a conical transition region extending between the load application means and the bottom section, and a conical first end.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a view of the fastening element shown in FIG. 2 in direction of arrows III; and FIG. 4 a longitudinal cross-sectional view of a third embodiment of a fastening element according to the present invention.

DETAILED DESCRIPTION OF THE PREFERRED EMBODIMENTS

Figure 1:
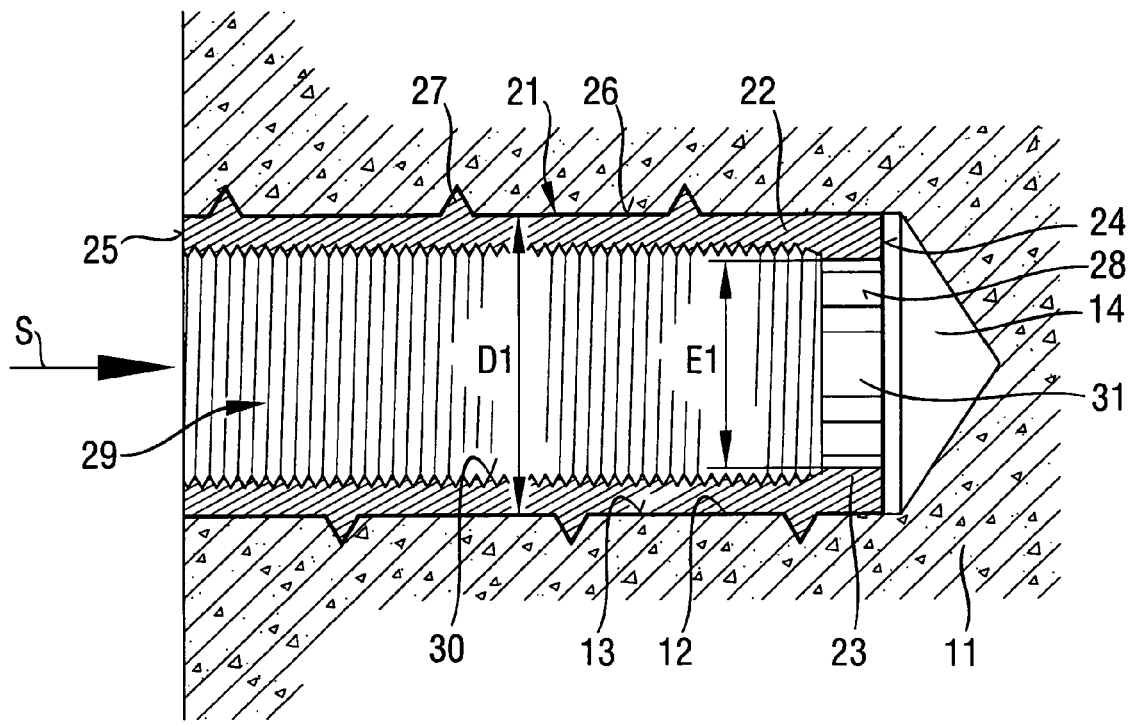
FIG. 1 a longitudinal cross-sectional view of a first embodiment of a fastening element according to the present invention in a set condition.

A fastening element 21 for hard constructional components 11, a first embodiment of which is shown in FIG. 1, has a cylindrical base body 22 on an outer side 26 of which, a self-tapping thread 27 is provided. The base body 22 has a first, facing in a setting direction S, end 24 with a bottom section 23 and a second end 25 remote from the first end 24. The base body 21 further has located inside, engagement means 28 for a setting bit (not shown) and formed as a through-opening 31 in the bottom section 23. The maximal diameter E1 of the through-opening 31 corresponds to about 70% of the core diameter D1 of the base body 22. The base body 22 further has a receptacle 29 that opens to the second end 25. The receptacle 29 is provided with an inner thread that serves as load application means and adjoins the engagement means 28 in a direction toward the second end 25.

For setting the fastening element 21 in the hard constructional component 11, here, e.g., a concrete component, firstly a borehole 12 is formed and then the fastening element 21 is inserted thereinto. With a suitable setting bit, not shown here, a torque is transmitted to the fastening element 21 via the engagement means 28, and the fastening element 21 is screwed in the borehole 12. The self-tapping thread 27 forms a complementary thread in the borehole wall 13 for forming an undercut therein. Through the opening 31, an access to the space 14 in front of the fastening element is possible and which, e.g., can be filled with mortar.

Figure 2:
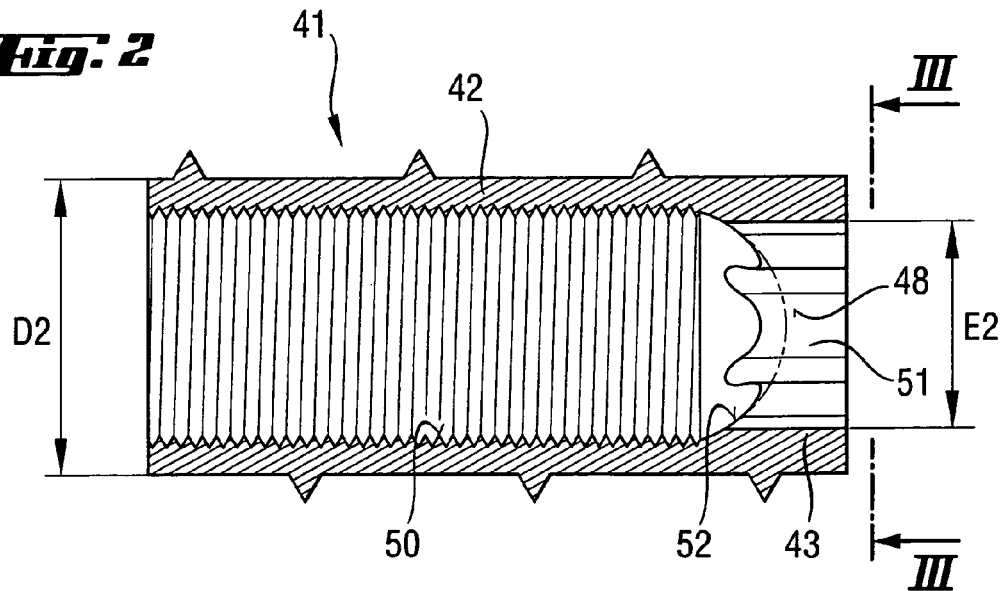
FIG. 2 a longitudinal cross-sectional view of a second embodiment of a fastening element according to the present invention.

A second embodiment of a fastening element 41 for hard constructional components, which is shown in FIGS. 2-3, has, in addition to elements of the fastening element 21 shown in FIG. 1, a spherical transition region 52 between the load application means 50 and the bottom section 43 of the base body 42. The spherical transition region 52 serves for guiding a setting bit within the fastening element 41. The contact surface of the engagement means 48, with which the setting bit cooperates, is noticeably increased in comparison with the contact surface of the engagement means 28 of the fastening element 21 shown in FIG. 1. Alternatively, the transition region 52 can be made conical.

As particularly shown in FIG. 3, the through-opening 51, which forms the engagement means 48 in the bottom section 43 for the setting bit, is formed for engagement with TORX-shaped setting bit. The maximal diameter E2 of the through-opening 51 corresponds to about 80% of the core diameter D2 of the base body 42.

The third embodiment of a fastening element 61 for hard constructional components has a base body 52 with a first end 64 having a conical profile. The engagement means 68 is formed as a through-opening 71 in the bottom section 63 of the base body 62. The contact surface of the engagement means 68 for the setting bit has, in comparison with the contact surface of the engagement means 28 of the fastening element 21 shown in FIG. 1, a noticeably bigger surface area. The conical profile of the first end 64 facilitate insertion of the fastening element 61 in the borehole and its centering when the fastening element 61 is screwed into the borehole. The maximal diameter E3 of the opening 71 corresponds to about 50% of the core diameter D3 of the base body 62.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A fastening element for attaching objects to hard constructional components, comprising a cylindrical base body (22; 42; 62) having a first end (24; 64) with a bottom section (23; 43; 63) that narrows an inner diameter of the cylindrical based body (22; 42; 63), a second end (25) remote from the first end (24), inwardly located engagement means (28; 48; 68) for a setting bit and formed as a through-opening (31; 51; 71) in the bottom section (23; 43; 63), and a receptacle (29) opening toward the second end (25), adjoining the engagement means (28; 48; 68) in a direction toward the second end (25), and provided with load application means (30; 50) for enabling attachment of an object to a constructional component and spaced from the engagement means (28, 48); and a self-tapping thread (27) provided, at least regionwise, on an outer surface (26) of the base body (22, 42; 62), wherein the first end (64) of the base body (62) has a conical profile.

* * * * *